LOW NOISE HETERODYNE VLF RECEIVER SYSTEM

Filed Feb. 27, 1964 3 Sheets-Sheet 1

DAVID SHEFFET,
INVENTOR.

BY HIS ATTORNEYS.
Spensley & Horn

LOW NOISE HETERODYNE VLF RECEIVER SYSTEM

Filed Feb. 27, 1964 3 Sheets-Sheet 2

DAVID SHEFFET,
INVENTOR.

BY HIS ATTORNEYS
Spensley & Horn

LOW NOISE HETERODYNE VLF RECEIVER SYSTEM

Filed Feb. 27, 1964 3 Sheets-Sheet 3

DAVID SHEFFET,
INVENTOR.

BY HIS ATTORNEYS
Spensley & Horn.

United States Patent Office 3,365,670
Patented Jan. 23, 1968

3,365,670

LOW NOISE HETERODYNE VLF RECEIVER SYSTEM

David Sheffet, Altadena, Calif., assignor to Western Geophysical Company of America, Los Angeles, Calif., a corporation of Delaware Filed Feb. 27, 1964, Ser. No. 347,782
10 Claims. (Cl. 325—473)

ABSTRACT OF THE DISCLOSURE

A two-stage noise-reducing system involving the use of back-to-back diodes in combination with resistors and condensers providing a non-linear non-clipping signal compressor circuit. The second feature employs a combination of diodes, condensers and resistors to prevent overloading by large signals eliminating the need for automatic gain control.

The present invention presents improvements in my previously invented VLF Receiver which is the subject of a co-pending U.S. patent application, Ser. No. 209,635 entitled V.L.F. Radio Receiver filed July 13, 1962, now Patent No. 3,137,817. While my earlier VLF receiver resulted in a substantial reduction in size and weight over prior art receivers while offering other indicated and substantial advantages, some difficulties remained. The signal to noise ratio was not as high as might be desired in the presence of local electrical disturbances. In addition, as signals for VLF receivers may be received over extremely long distances, the amplitude of the input signals may vary considerably.

It is therefore an object of this invention to provide a VLF receiver which includes a multi-level noise reducing system.

Another object of this invention is to provide a pulse overload protection circuit for a multi-stage amplifier.

Yet another object of the present invention is to provide a VLF receiver including a pulse overload protection circuit.

A still further object of the present invention is to provide a VLF receiver of the character described which performs a demodulation function.

The novel features which are believed to be characteristic of the invention, both as to its organization and method of operation, together with further objects and advantages thereof will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

Figures 1, 3, 3A, 3B, 4A, 4B:
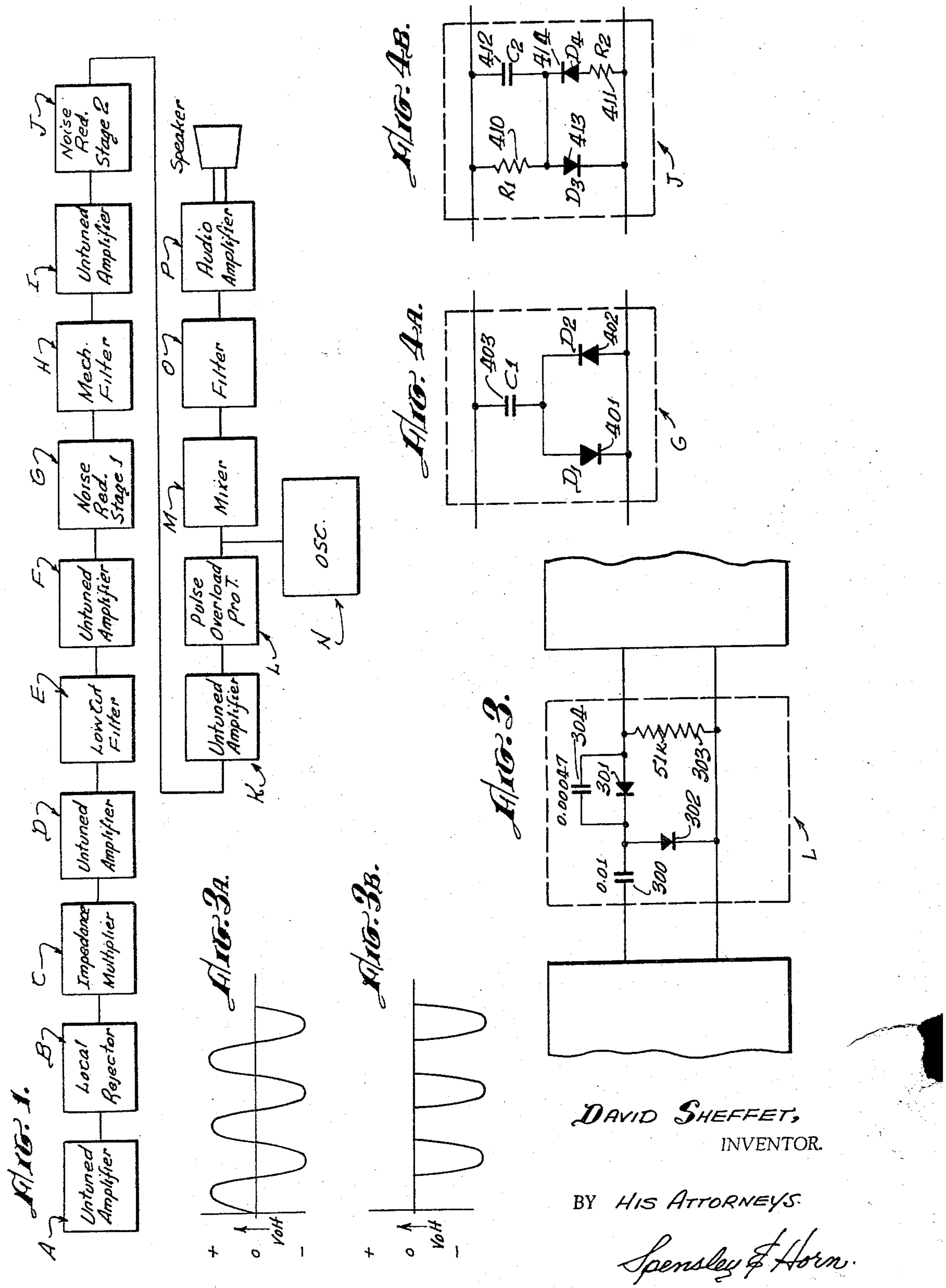
FIGURE 1 is a block diagram of the presently preferred VLF receiver in accordance with this invention.
FIGURE 3 is a circuit diagram of the pulse overload protection circuit forming part of the present invention.

FIGURES 3A and 3B are wave shape diagrams of signals received and transmitted, respectively, by the circuit of FIGURE 3; and FIGURES 4A and 4B are circuit diagrams of each of the two stages shown in FIGURE 1 which serve as noise reducing stages, in accordance with the presently preferred embodiment of this aspect of the invention. Letters in FIGURE 1 key the generalized major circuitry components to the detailed circuit diagrams of FIGURES 2A, 2B, 3, 4A and 4B. For example, block A, FIGURE 1, "Untuned Amplifier" is shown in detail in the dotted block labeled A in FIGURE 2A.

Referring now to the drawings, there is shown in FIGURE 1, a functional block diagram of the present invention improved VLF receiver, the functional blocks being designated by the reference letters A–P. Incoming VLF radio signals are received by an untuned RF amplifier A, which are then fed to a resistance coupled amplifier D through a selectable rejector B and impedance matching stage C. The output of the amplifier D is fed to a low cut filter E and thence to a second untuned amplifier F. The output of the amplifier F is in turn fed through a noise reducer circuit block G stage 1, which will hereinafter be explained. The output from stage 1 is subsequently (not not directly) fed to stage 2 which forms the second part of the noise reducer circuit block J in accordance with the present invention. It is first filtered through filter H and thence amplified by a third untuned amplifier I. The output from J is now fed into a fourth untuned amplifier K and thence to a pulse overload protector circuit L, which forms an integral and important part of the present invention; it will be described in some detail hereinafter. The output of the overload protector circuit L together with that of a local oscillator N are both fed into the input of mixer stage M. The output from the mixer stage in turn is filtered and amplifier by filter stage O and audio amplifier P from which the signal may be received by a speaker.

In operation, VLF signals are picked up by the antenna, not shown, and fed to amplifier A where they are amplified and fed through selectable local rejector B.

Amplifier A is a broad band amplifier which will amplify all signals in the VLF range. Local rejector B is a narrow band filter and serves to reject local strong signals which are of frequencies close to that of the primary signal in the VLF range which the receiver is seeking to receive.

In VLF there are transmitting stations which operate at as high as one to two million watts. When a VLF receiver is being used in the vicinity of such a station and is attempting to communicate with a distant station, it is necessary to reduce the strong local signal early in the receiver to prevent overloading subsequent stages. This is particularly important when the gain control is wide open while the receiver is actually tuned to a weak distant station on an adjacent channel.

The impedance matching circuit C serves to match the output impedance of the local rejector B to the input impedance of the untuned amplifier D.

This permits a higher terminating resistance on the local rejector output than could be obtained by the normal input resistance of amplifier D. The high input impedance of stage C makes possible a sharp and deep rejection notch to be obtained by the local rejector B, thus resulting in maximum attenuation to a powerful local signal.

Figure 2A:
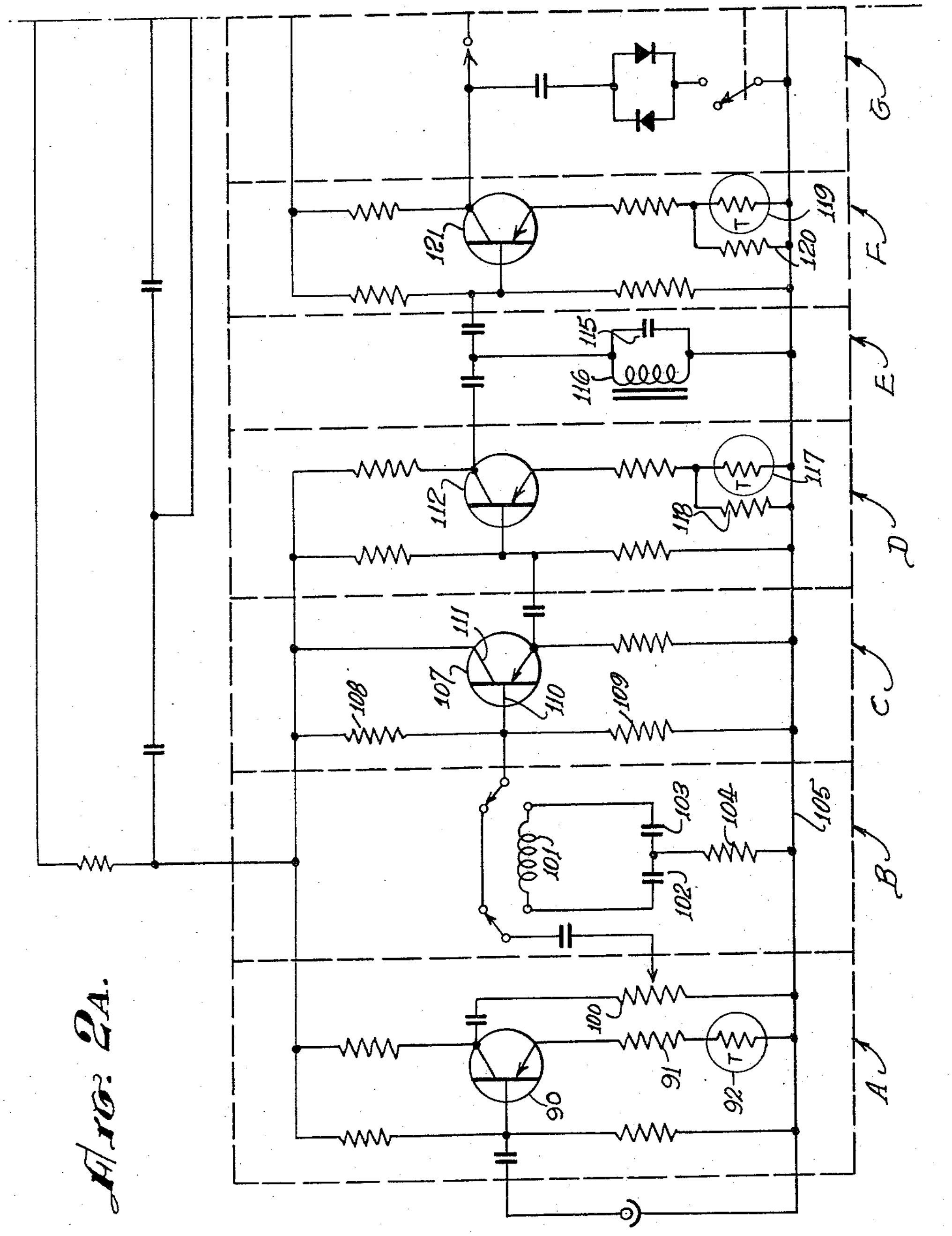
FIGURES 2A and 2B are a schematic circuit diagram of the receiver of FIGURE 1.

In FIGURE 2A the local rejector is shown to consist of a T arrangement including an inductor 101 and capacitors 102 and 103. The local rejector follows the untuned amplifier stage consisting of transistor 90. A resistor 91 and a Sensistor 92 are provided in the emitter circuit of transistor 90. A resistance 104 is connected to ground line 105. The impedance multiplier stage C includes a PNP transistor 107 and a voltage divider including resistors 108 and 109. The resistor 108 is connected between the base 110 and the collector 111, and the resistor 109 is connected between the base 110 and line 105.

Amplifier D is a broad band amplifier similar to that of amplifier A.

The untuned amplifier D consists of one stage of amplification utilizing PNP transistor 112 which is connected in a self-biased common emitter configuration.

Circuit E is a low cut filter, i.e., it cuts off all signals below the lowest in the VLF range, e.g., 10 kc. and passes all thereabove in said range. The filter E is shown as a parallel resonant circuit including capacitor 115 and inductor 116. Untuned amplifier F, again, is similar to amplifiers A and D and serves to amplify all signals received by it which fall in the VLF range, i.e. from 10 kc. to 60 kc.

Transistor 121 which serves as amplifier stage F is similar in all regards to amplifier stage D. Note that in both circuits the stage gain is rendered stable with temperature by use of a Sensistor, together with a shunting resistor, numbered 117 and 118 respectively for stage D and Sensistor 119 and resistor 120 for stage F. A sensistor is a postive linear temperature coefficient resistor made by Texas Instruments, Inc.

The operation of the noise reduction stage 1 shown in box G will be explained hereinafter, together with stage 2 shown in box J.

The mechanical filter H is a selectable filter of a type well known to the art, which is tuned to any of several pre-set frequencies in the VLF range. While in the presently preferred embodiment this filter is a mechanical crystal, it will be readily apparent to one skilled in the art that an electronic tuned circuit may be substituted therefor. The output from the mechanical filter H is again amplified by an untuned amplifier I (transistor 122 in FIGURE 2B) which is similar to amplifiers A and D. After the output from amplifier I passes through noise reducer J the signal again is amplified by still another untuned amplifier K.

The amplifier K is a single stage resistance coupled PNP transistor amplifier 125.

Next, the output from the untuned amplifier K is fed into the pulse overload protector circuit L whose specific function and operation will be hereinafter described. The local oscillator N is tuned to a predetermined frequency different from that of the received signal frequency so that when the oscillator and signal frequency are combined in the mixing stage M the resulting heterodyne frequency will fall into the audio range.

Figure 2B:
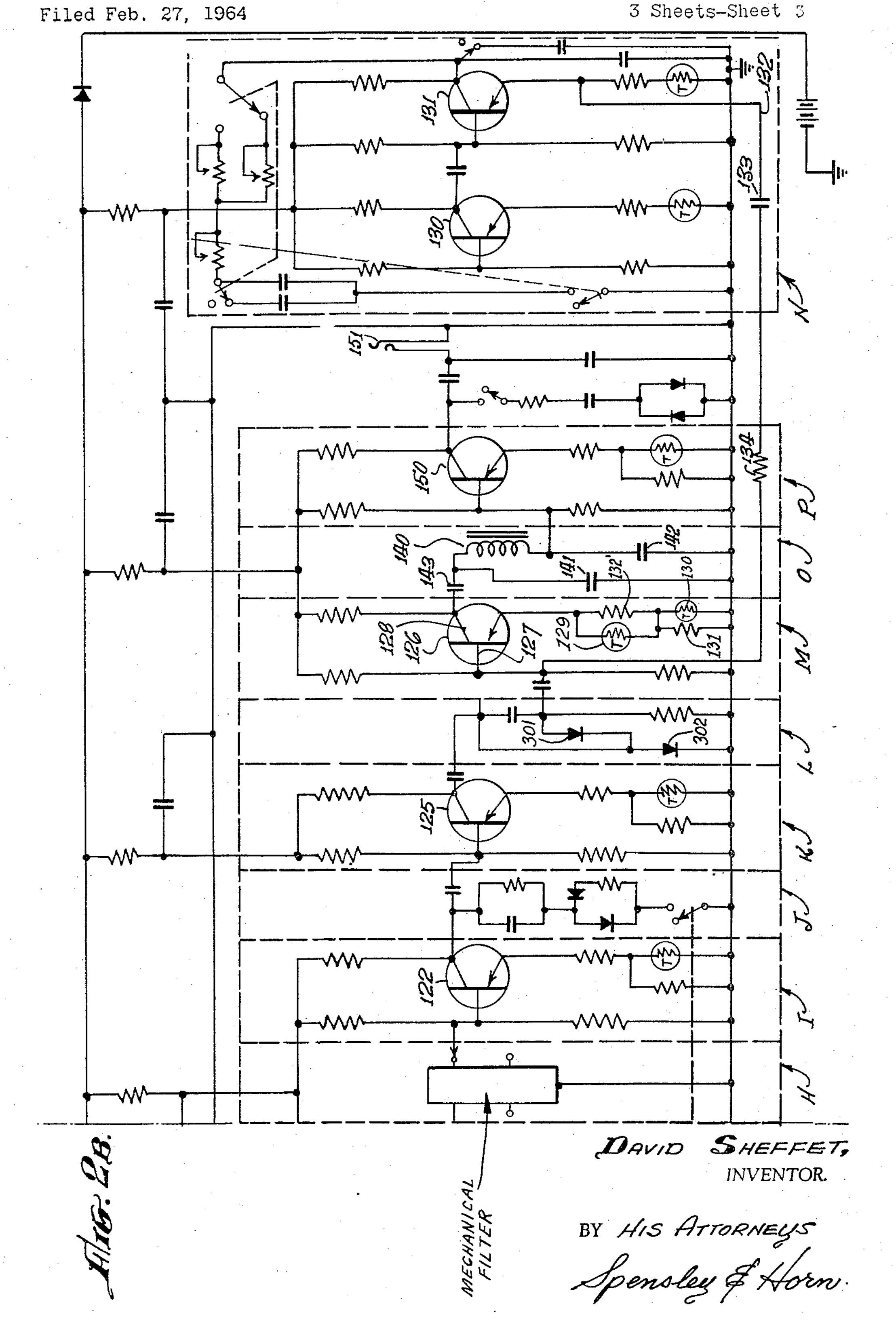

The oscillator N is of the R–C feedback type and utilizes transistors 130 and 131, (see FIGURE 2B). The output of oscillator N is fed to the mixer stage M (transistor 126 in FIGURE 2) over lead 132 through a series RC network consisting of a capacitor 133 and a resistor 134. The mixer is a PNP transistor 126 which is connected in a self-biased common emitter configuration. Thermistor 129 and Sensistor 130, together with resistors 131 and 132' are provided in the emitter circuit of transistor 126.

The filter O is of the low pass type or high cut type, utilizing a series inductor 140 and shunt capacitors 141 and 142; the cut off frequency of the low pass filter is slightly above 1 kc. so that 1 kc. signals will pass therethrough with a minimum of attenuation while signals of higher frequencies will be greatly attenuated.

The output from the filter O, consisting of the 1 kc. heterodyne signals which are interrupted or pulsed (code signals being assumed), is fed to the audio amplifier P.

In the presently preferred embodiment this amplifier includes a single stage PNP amplifier transistor 150 which is connected in a self biased common emitter configuration. The output of the amplifier P is shown connected to a phone jack 151 to which a headphone or a loudspeaker may be connected.

Reference is now made to FIGURE 3 wherein there is shown the presently preferred pulse overload protection circuit in accordance with this invention. This circuit is represented by box L in FIGURE 1. As the signal received by this circuit is one which includes signals of varying amplitude it becomes desirable and often necessary to prevent overload. An automatic gain control stage is not practical as it cannot follow a series of pulses whose time duration varies (as is the case with VLF code signals) and where the time interval between pulses also varies.

Input signals to a VLF receiver vary over a considerable amplitude range, depending upon the distance of the receiver from the transmitting source and depending also, of course, upon the power level of the transmitter. If the gain was attempted to be turned up by adjustment of the potentiometer 100 (see FIGURE 2A) while receiving a very strong signal, it was found by the inventor that the mixer stage M (transistor 126 in FIGURE 2B) was cut off each time the positive half cycle of the incoming signal (see FIGURE 3A) hit the base 127 of transistor 126 (the mixer stage). The present invention circuit obviates this problem by effectively eliminating the positive half cycles of the incoming signals in a novel manner. By this circuit, the pulses are not clipped but they are instead converted to pulses of one polarity only. The circuit as shown in FIGURE 3 includes a capacitor 300 in series with a first diode 301. Connected in shunt between the capacitor 300 and diode 301 is another diode 302, while in shunt on the other side of diode 301 is a load terminating resistor 303 (in this embodiment having a value of 51K ohms). Finally and importantly, there is provided a capacitor 304 of small value 0.00047 microfarad across the diode 301.

As was previously mentioned, this circuit serves to convert all incoming VLF pulses to a single polarity. The polarity is selected so as to drive the following stage M (transistor 126 in FIGURE 2B) into the region of greater conduction rather than the region of lesser conduction. This is done in order to permit higher amplitude signals to be handled before absolute blocking of the mixer stage M occurs.

In FIGURE 3, the pulse protector circuit is shown in detail within the dotted box L which is located intermediate stages K and M in FIGURE 1. In FIGURE 3A there is shown a typical incoming sinusoidal signal which may be a code signal in the VLF range. It is a signal of this wave pattern which will typically be received by the present invention pulse protection circuit. In FIGURE 3B, there is shown a typical pulse train output from the FIGURE 3 circuit. Note that all of the waves in the signal are of negative polarity. The output of circuit L is not filtered as pure DC is not desired. This circuit is essentially a modified half wave voltage doubler. It is however important to retain the original frequency of the incoming pulse train in order to drive the mixer stage M in one direction only with this original frequency. This is necessary in order to obtain an audio frequency beat note of about 1000 c.p.s. with the signal from the local oscillator which will typically be set at 1000 c.p.s. above or below that of the incoming signals. For example, if the incoming signal is of a frequency of 18 kc., the local oscillator would be set at 17 kc. Thus, the beat frequency possibilities are 35 kc., 1 kc., 17 kc. and 18 kc. The filter is adapted to reject all but 1 kc.

The mixer stage M is a non-linear device (transistor 126 in FIGURE 2B) which accepts the input single polarity AC wave and mixes it with the locally generated signal (e.g. 17 kc. from oscillator N) so that the output as indicated above, has a difference frequence (e.g. 1 kc.), (a sum frequency e.g. 35 kc.), plus the two original frequencies (e.g. 17 kc. and 18 kc.). The wave forms of the sum and difference frequency waves are not pure sine waves as they would be if two actual sine waves were mixed in a mixer stage. In this invention, the signal sine wave (when the incoming signal is an interrupted carrier signal, as opposed to a signal tone which modulates a carrier wave) has been converted into an alternate half cycle sine wave of one polarity only. The local oscillator generates a wave of high harmonic content, and the combination of the generated wave with the half cycle fundamental signal wave produces a difference frequency wave of high harmonic content which is then filtered by the low pass or high cut filter O which only allows through the beat frequency of 1 kc. in this example, attenuating all other frequencies in order to produce a good audio tone in this output. The low pass filter O eliminates all components except the difference frequency of 1000 c.p.s. which signal is fed into the output stage consisting of the audio amplifier P. The mixer stage has its DC bias potentials adjusted so as to obtain a maximum difference frequency component in the output and also to have a greater potential swing in the collector 128 of transistor 126 when the AC input signal is negative (transistor 126 being a PNP transistor; the reverse would be the case where an NPN transistor to be employed) than it would have if the input signal had entirely positive waves. If the input AC signal were one with its axis at zero potential, the mixer stage would be cut off by relatively large AC signals (i.e. of the order of more than 1 micro volt at the VLF receiver input) which would drive the base of transistor 126 to positive potential (for PNP transistors) and to a negative potential for NPN transistors. This is because the transistor would be driven to cut off or zero current in the collector circuit.

If the mixer stage M is employed without the present invention pulse overload protection circuit, large incoming AC signals (i.e. above 1 micro volt) would drive the base of the transistor 126 to zero potential and then into saturation on alternate half cycles, so that the mixer stage M would effectively be blocked every half cycle. The positive half of the cycle would tend to block a PNP mixer transistor and the negative half cycle would tend to block the mixer stage if it employed an NPN transistor.

For a PNP transistor in the mixer stage, as shown in FIGURE 2, the half cycle sine wave input signal must have a negative polarity in order to drive the collector to maximum conduction. For an NPN transistor, the half cycle sine wave which has resulted from the input signal passing through the circuit of FIGURE 3 (with the diodes 301 and 302 reversed) must have a positive polarity (opposite that shown in FIGURE 3B) in order to drive the collector to maximum conduction. The same technique would, of course, apply to a vacuum tube mixer except that in such a case only the positive output polarity could be used to drive the plate of the tube toward maximum conduction; a negative polarity excessive signal would always drive any tube to cutoff.

It has been found by the inventor that the series semiconductor diode 301 in FIGURE 3 tends to reduce the overall system sensitivity appreciably for weak incoming signals, i.e. of the order of less than 0.1 micro volts. In order to overcome this effect, it has been found necessary by the inventor to shunt the diode 301 with a capacitor 304. In the presently preferred embodiment of this invention, a value of 0.00047 microfarad has been found to be optimum. The value of this capacitor may vary from something less than .00047 up to .005 but if it exceeds the latter value, the effectiveness of the pulse overload system is reduced.

Any other pulse overload protection circuit, other than that shown in FIGURE 3, may be used, if and only if the input pulses are unipolar and therefore tend to drive the mixer stage into the region of greater current conduction. Also, if there is a series diode element, equivalent to diode 301, it must be recognized that a weak signal will not produce sufficient conduction through this element unless it is optimally shunted by a capacitor. This will not adversely affect the proper functioning of this element (the diode 301 or its equivalent) at high signal levels.

Reference is now made to FIGURES 4A and 4B wherein there is shown each of the two stages of the present invention multilevel noise reducing system. These two stages may be employed with any amplifier and are here shown in connection with and part of the present invention VLF receiver. Stage 1 is equivalent to block G in FIGURE 1, intermediate amplifier stage F and filter H while stage 2 is equivalent to block J intermediate amplifiers I and K, (see FIGURE 1). The combination of these two stages serves to greatly reduce both random and synchronous noise which has entered an amplifier and which may include peak amplitude signals greater in magnitude than the input signals to the amplifier. In general, it may be said that this invention two stage system operates in the following manner.

The first stage G eliminates or greatly reduces the high peak noise and the second stage J eliminates or greatly reduces the residue. The first stage includes two diodes 401 and 402, which are in parallel and oppositely polarized together with a capacitor 403, all of which in combination are shunted across the output of the preceeding amplifier stage, block F in FIGURE 1. The capacitor 403 serves to prevent any DC voltage at the output of the amplifier from passing through either of diodes 401 and 402 to ground. If DC current were permitted to pass through one of the diodes to ground, then the one diode passing such current would be more conducting than its counterpart, rendering it impossible to eliminate noise peaks of that particular polarity. In addition, this would result in a drastic reduction in the output level of the previous amplifier stage. Another function of the capacitor 403, is to determine the maximum time duration of a noise peak which will pass through the capacitor and into the diode of proper polarity; proper that is, for the polarity of the received pulse. The condenser 403 must have at least a certain minimum value, typically of the order of 0.1 microfarad to all noise pulses up until the maximum time duration of the pulses indicated. The diodes 401 and 402 must have a high front to back ratio, i.e., of the order of at least 20,000 to 1; almost any good silicon diode will be adequate.

The conductivity of the diodes 401 and 402 varies with the applied voltage tending to increase at high voltage levels. This non-linearity characteristic renders it possible to compress a large range of noise pulses whose amplitude exceeds the signal level. The diodes are not biased and do not rectify unless there is a relatively high noise pulse, e.g. one greater in amplitude than the incoming signal level. In this manner, they differ from ordinary clippers or limiters. The application of this first network has been found to reduce the signal level from 2 to 3 db but does not change the wave shape of the signal as there is no rectification by either diode at the input signal level. It is most important that there be no rectification of the signal and in order to insure this, it is necessary to place the network at the proper number of stages after the pre-amplifier in first stage, block A in FIGURE 1. This is determined by observing the level at which the diodes begin to clip the signal. It has also been found important for this first network, block G, to be situated prior to the filter network H so that no large noise pulses will be received by the filter to cause large level output wave trains or "ringing" as it is often called. This latter consideration is of special importance when the filter is of the narrow band type or is the case in the presently preferred embodiment of this invention.

As was previously mentioned, the first stage G of the noise reducing system, serves to protect the filter from overload and reduce the large level noise pulses. The output from the filter H is then fed to amplifier I thus raising the signal level and the remaining noise level by a comparable factor. This amplified signal, including the residual noise, is now fed into stage 2 of the present invention noise reducing system. This stage J consists of resistors 410 and 411, condenser 412 and diodes 413 and 414. The second noise reducing stage serves to reduce the noise peaks of a smaller level than that attenuated by the first stage. In addition, it tends to reduce the amplitude of the received signal slightly.

The inventor has found that the combination of both noise reducing stages is required to insure a substantial increase in the signal to noise ratio. It has been found that if the second stage were to be used alone, it is ineffective for high level noise as the system, including the filter and the succeeding amplifier stages becomes overloaded. This produces other spurious noise and saturates the system so that the signal and noise cannot be separated on the basis of relative levels. On the other hand, if the first stage is used alone, only a partial noise reduction is effected while admittedly preventing filter and subsequent amplifier stage overload. However, some noise peaks of lesser amplitude remain which must be eliminated in stages following the filter H as the signal passing therethrough is subsequently amplified. By placing the second stage of the noise reducing system directly at the filter output (i.e. without an intermediate stage of amplification) it has been found to be ineffective; likewise, it has been found to be ineffective to place the second noise reducing stage at the input to the filter H. If it were to be placed here it would be in parallel with the first noise reducing stage and thus add nothing to the noise reducing action of the first stage.

In the second stage, the resistor 410 should be a high value, i.e., between 100K and 1000K ohms. It serves to shunt the capacitor 412 which in combination feeds the noise signals to the combination of the oppositely polarized diodes 413 and 414. Resistor 410 and capacitor 412 need be in shunt, for if they were employed separately, it has been found that the noise reducing effect desired is not achieved. This effect applies to low level pulse type noise peaks which pass through the filter H after the larger noise peaks have been significantly attenuated ahead of the filter by stage 1.

The resistor 410 serves to further effect a noise reduction for reasons not entirely understood by the inventor. In fact, it has been found by the inventor that by use of the resistor 410, the signal to noise ratio is doubled at this stage. In order for this effect to be realized, it has been emphatically determined by the inventor that resistor 410 must be substantially more than 1/10 megohm irrespective of the value of capacitor 412.

Resistor 411 in the stage 2 is included for the purpose of preventing a reduction in the audio signal level when the signal received by the VLF receiver is a modulated carrier wave which is continuously received, rather than an interruption of the carrier type signal often used in VLF transmission of code signals. Resistor 411 should be in the range from 1K to 20K ohms.

A modulated signal will be largely, although not necessarily, 100% demodulated, by the combination of diodes 413 and 414, in the absence of resistor 411; that is, this resistor serves to prevent the modulating signal from being stripped from the carrier wave. It may not be desirable to demodulate the carrier until further on in the system. Resistor 411 prevents this at this stage by reducing the effectiveness of diode 414, thus by increasing the effective voltage drop between the capacitor 412 and ground.

What is claimed is:

1. In an amplifying system adapted to receive an AC input signal including positive and negative pulse portions and means for heterodyning said signal at a later stage in said amplifying system, pulse protection means for protecting said later stage from overload during one of the positive or negative pulse portions of said input signal, said pulse protection means including:

first diode means connected in series between the source of said input signals and said means for heterodyning;

second diode means in shunt with the input side of said pulse protection means and connected to said first diode means, said second diode means having its anode connected to the cathode of said first diode means;

first capacitance means in series between said first diode means and the input side of said means for protecting;

load resistance means connected to the side of said first diode means opposite said first capacitance means, said resistance means being in shunt with the combination of said first and said second diode means; and second capacitance means in shunt with said first diode means.

2. In the pulse protection means as defined in claim 1, said second capacitance means being in the range from just below 0.00047 microfarad to 0.005 microfarad.

3. In an amplifying system adapted to receive an AC input signal including positive and negative pulse portions and means for heterodyning said signal at a later stage in said amplifying system, pulse protection means for protecting said later stage from overload during one of the positive or negative pulse portions of said input signal, said pulse protection means including:

first diode means connected in series between the source of said input signals and said means for heterodyning;

second diode means in shunt with the input side of said pulse protection means and connected to said first diode means, said second diode means having its anode connected to the cathode of said first diode means;

first capacitance means in series between said first diode means and the input side of said means for protecting; and second capacitance means in shunt with said first diode means.

4. In an amplifying system adapted to receive an AC input signal including positive and negative pulse portions and means for heterodyning said signal at a later stage in said amplifying system, pulse protection means for protecting said later stage from overload during one of the positive or negative pulse portions of said input signal, said pulse protection means including:

first diode means connected in series between the source of said input signals and said means for heterodyning;

second diode means in shunt with the input side of said pulse protection means and connected to said first diode means, said second diode having its anode connected to the cathode of said first diode means;

load resistance means connected to the side of said first diode means opposite said second diode means, said resistance means being in shunt with the combination of said first and said second diode means; and capacitance means in shunt with said first diode means.

5. In an amplifying system a two stage noise reducing system, said first stage being a non-linear, non-clipping signal compressor circuit and being coupled to the output of a first amplifier whose output includes peak amplitude signals greater in magnitude than the input signals to said amplifier and a second stage coupled to the output of a second amplifier at a later stage in said amplifying system, said first stage including:

first and second diode means in parallel opposing relationship, said first and second diodes being connected at a junction point;

and capacitance means being connected to said junction point, the combination of said capacitance means and said first and second diode means being shunted across said first amplifier, said diodes being connected at the side opposite said junction point substantially to ground potential.

6. In an amplifying system a two stage noise reducing system, said first stage being coupled to the output of a first amplifier whose output includes peak amplitude signals greater in magnitude than the input signals to said amplifier and a second stage coupled to the output of a second amplifier at a later stage in said amplifying system, said second stage including:

first resistance means and first diode means, said first resistance means and said first diode means being interconnected at a first junction point;

first capacitance means and second diode means, said first capacitance means and said second diode means being interconnected at a second junction point;

means connecting said first and second junction points to each other;

said first and second diode means being in parallel opposing relationship;

and second resistance means connected to the terminal of said second diode means opposite said second junction point.

7. In an amplifying system, a two stage noise reducing system, said first stage being coupled to the output of a first amplifier whose output includes peak amplitude signals greater in magnitude than the input signals to said amplifier and a second stage coupled to the output of a second amplifier at a later stage in said amplifying system, said first stage including:

first and second diode means in parallel opposing relationship, said first and second diode means being connected at a first junction point;

first capacitance means being connected to said first junction point, the combination of said first capacitance means and said first and second diode means being shunted across the output of said first amplifier;

said second stage including:

first resistance means and third diodes means, said first resistance means and said third diode means being interconnected at a second junction point;

second capacitance means and fourth diode means, said second capacitance means and said fourth diode means being interconnected at a third junction point;

means connecting said second and third junction points to each other, said third and fourth diode means being in parallel opposing relationship; and third resistance means connected to the terminal of said fourth diode means opposite said third junction point.

8. In a noise reducing system as defined in claim 6 wherein said first resistance means in said second stage is of a value between 100K and 1000K ohms and wherein said second resistance means in said second stage is of a value between 1K and 20K ohms.

9. In a VLF receiver the combination including:

a first untuned amplifier;

a first noise reducing stage coupled to the output of said first amplifier, said first noise reducing stage including first and second diode means in parallel opposing relationship, said first and second diode means being connected at a first junction point;

and first capacitance means connected to said first junction point; the combination of said first capacitance means and said first and second diode means being shunted across the output of said first amplifier;

a second untuned amplifier coupled to the output of said first noise reducing stage;

a second noise reducing stage coupled to the output of said second amplifier, said second noise reducing stage including:

first resistance means and third diode means, said first resistance means and said third diode means being interconnected at a second junction point;

second capacitance means and fourth diode means, said second capacitance means and said fourth diode means being interconnected at a third junction point;

means connecting said second and third junction points together, said third and fourth diode means being in parallel opposing relationship;

second resistance means connected to the terminal of said fourth diode means opposite said third junction point;

a third untuned amplifier coupled to the output of said second noise reducing stage, said third amplifier being adapted to receive an A.C. input signal including positive and negative pulse portions;

means for heterodyning said signal from said third amplifier at a later stage in said receiver;

and pulse protection means coupled between said third amplifier and said means for heterodyning, said pulse protection means including fifth diode means connected in series between the source of said input signal and said means for heterodyning;

sixth diode means in shunt with the input side of said pulse protection means and connected to said fifth diode means, said sixth diode means having its anode connected to the cathode of said fifth diode means;

third capacitance means in series between said sixth diode means and the input side of said means for protecting;

load resistance means connected to the side of said fifth diode means opposite said third capacitance means, said load resistance means being in shunt with the combination of said fifth and said sixth diode means; and, fourth capacitance means in shunt with said fifth diode means.

10. In an amplifying system including in combination:

a first amplifier;

a first noise reducing stage coupled to the output of said first amplifier, said first amplifier having an output including peak amplitude signals greater in magnitude than the input signals thereto, said first noise reducing stage including first and second diode means in parallel opposing relationship, said first and second diode means being connected at a first junction point;

first capacitance means being connected to said first junction point, the combination of said first capacitance means and said first and second diode means being shunted across the output of said first amplifier;

a filter network coupled to the output of said first noise reducing stage;

a second noise reducing stage including first resistance means and third diode means, said first resistance means and said third diode means being interconnected at a second junction point;

second capacitance means and fourth diode means, said second capacitance means and said fourth diode means being interconnected at a third junction point;

said fourth diode means being in parallel opposing relationship with said third diode means, and third resistance means connected to the terminal of said fourth diode means opposite said third junction point;

a third amplifier coupled to the output of said second noise reducing stage;

and pulse overload protection means coupled to the output of said third amplifier.

References Cited

UNITED STATES PATENTS 2,942,197 6/1960 Madsen et al. -------- 328—171

KATHLEEN H. CLAFFY, *Primary Examiner.*

R. LINN, *Assistant Examiner.*